United States Patent [19]

Eichenauer et al.

[11] Patent Number: 5,554,722
[45] Date of Patent: Sep. 10, 1996

[54] AROMATIC POLYAMIDE COMPOSITIONS WITH IMPROVED ELECTROSTATIC PROPERTIES, FORMED STRUCTURES PRODUCED THEREFROM, AND USE AND PRODUCTION THEREOF

[75] Inventors: Dieter Eichenauer, Kriftel; Werner Groh, Lich; Hans-Tobias Macholdt, Darmstadt; Jörg Dahringer, Bobingen; Holger Jung, Niedernhausen; Richard Neuert, Winkelhaid, all of Germany

[73] Assignee: Hoechst AG, Germany

[21] Appl. No.: 290,378

[22] Filed: Aug. 15, 1994

[30] Foreign Application Priority Data

Aug. 17, 1993 [DE] Germany ............ 43 27 595.8

[51] Int. Cl.⁶ .................................... C08G 69/26
[52] U.S. Cl. ............ 528/340; 524/600; 524/602; 524/606; 528/180; 528/183; 528/184; 528/185; 528/310; 528/312; 528/314; 528/319; 528/335; 528/336; 528/337; 528/348
[58] Field of Search .................... 528/180, 183, 528/184, 185, 310, 312, 314, 319, 335, 336, 337, 340, 348; 524/600, 602, 606

[56] References Cited

U.S. PATENT DOCUMENTS

| | | | |
|---|---|---|---|
| 4,789,504 | 12/1988 | Ohmori et al. | 264/22 |
| 4,847,354 | 7/1989 | Keil et al. | 528/340 |
| 4,987,217 | 1/1991 | Keil et al. | 528/340 |
| 5,097,018 | 3/1992 | Rubinstein | 530/383 |

FOREIGN PATENT DOCUMENTS

| | | |
|---|---|---|
| 0199090 | 3/1986 | European Pat. Off. |
| 0364891 | 10/1989 | European Pat. Off. |
| 0394893 | 4/1990 | European Pat. Off. |
| 0394892 | 4/1990 | European Pat. Off. |
| 0424860 | 10/1990 | European Pat. Off. |

OTHER PUBLICATIONS

"Elektret–Vliesstoffe–ein Schnell Wachsender Market bei Filtermedien", L. Bergmann, LaGrange, Ga/USA Chemiefasern/Textilindustrie, 40./92. Jahrgang, Jul./Aug. 1990 pp. T123–127.

"Charge Storage in Pure and Titanium Dioxide Doped Polyarylate, and Conduction in Pure Polyarylate", R. Nath & M. M. Perlman, 1990 Elsevier Science Publishers B.V. pp. 293.

Primary Examiner—Shelley A. Dodson
Attorney, Agent, or Firm—Connolly & Hutz

[57] ABSTRACT

Aromatic polyamide compositions with improved electrostatic properties, formed structures produced therefrom, and use and production thereof.

Described are compositions comprising an aromatic polyamide which is soluble in organic solvents and from 0.01 to 30% by weight, based on the weight of the composition, of an organic or organometallic charge control agent.

The compositions can be used for producing formed structures, in particular fibers; these fibers are preferably used for producing webs which can be used for producing dust filters.

38 Claims, No Drawings

AROMATIC POLYAMIDE COMPOSITIONS WITH IMPROVED ELECTROSTATIC PROPERTIES, FORMED STRUCTURES PRODUCED THEREFROM, AND USE AND PRODUCTION THEREOF

DESCRIPTION

Aromatic polyamide compositions with improved electrostatic properties, formed structures produced therefrom, and use and production thereof The present invention relates to compositions which comprise selected aromatic polyamides and which owing to the presence of charge control agents have improved electrostatic properties, and to formed structures produced therefrom such as one- and two-dimensional textile materials, in particular yarns, tows and webs containing or comprising these improved structures, to the use thereof, and to processes for producing the formed structures.

Structures for the purposes of this invention are formed structures, such as fibers, composed of electrically nonconductive aromatic polyamides which are capable of storing an applied electrostatic charge for a prolonged period and/or have a triboelectric charge buildup capacity.

Electret fibers have hitherto chiefly been described in connection with the problem of ultrafine dust filtration (for example by Biermann, "Evaluation of permanently charged electrofibrous filters", 17th DOE Nuclear Air Cleaning Conference, Denver, USA, (1982) and also in Chemiefasern/ Textilindustrie 40/92, (1990/9)). The filter materials described differ not only in respect of the materials from which the fibers are made but also in respect of the way the electrostatic charge is applied to the fibers.

The electrostatic charge can be applied by various methods. For instance, it is possible to apply a different electrostatic charge on each of the two sides of a polymer film and then to split it. This produces the split-film fibers, which are generally laid down in the form of a fiber web.

It is also known to spin into a strong electrostatic field or to expose the spun fibers or fiber products, e.g. webs, to an electric corona discharge, for example between high voltage tips or wires and grounded sheetlike electrodes.

Of particular advantage is charging through triboelectric effects, i.e. charge separation due to rubbing the fiber materials with other media, e.g. other polymer materials, solid bodies such as metal surfaces or else liquid or gaseous media.

Various fiber raw materials have been investigated in the past and recommended for producing electret fibers having advantageous electret properties, such as long-lasting charge stability, and moisture and chemical resistance. And these advantageous properties should also be achievable at minimal cost.

Very suitable electret materials have been found to be fluoropolymers such as polytetrafluoroethylene or perfluorinated ethylene-propylene copolymers in that they combine high charge stability, characterized by a charge half-life ranging from years to decades, with good thermal stability and low moisture regain. However, serious disadvantages of these polymers, such as their high price and the considerable difficulties of processing them, have largely prevented their use.

Good resistance to chemicals and moisture is also possessed by electret fibers composed of polyolefins, such as polyethylene or polypropylene, or of polycarbonates. Commercial very fine dust filters are composed of these electret materials (Chemiefasern/Textilindustrie, as cited above). A serious disadvantage of these fibers is the relatively low charge half-life which is only of the order of about one year. This is generally too short a period if it is considered that, e.g., when the fibers are used for filter production, the time from the fiber being produced to the filter coming into use plus the filter life can easily be above one year.

For as long as electret fibers have been recommended and used for the production of very fine filters, there has therefore been an ever-present urgent need for a fiber material which combines moderate price with distinctly improved charge stability, resistance to moisture and chemicals and good textile and mechanical properties, and indeed corresponding proposals have already been made.

U.S. Pat. No. 4,789,504 recommends enhancing the effectiveness of polypropylene electret filters by adding a fatty acid salt to the polymer material.

Journal of Electrostatics, 24 (1990), p. 283–293, discloses that the temperature at which, under standardized conditions of measurement, the charge density of a polyacrylate electret decreases by half increases from 126° to 180° C. when about 10% by weight of titanium dioxide are added to the polymer. However, this addition not only leads to a deterioration in the mechanical properties but also has the consequence of an enhanced moisture sensitivity which is at odds with a use in filter materials.

It has now been found that it is possible to use compositions based on selected aromatic polyamides to produce formed structures, such as fibers or films, which have good mechanical properties, an appreciably extended half-life of the electric charge and/or an improved triboelectric behavior and also high chemical and/or temperature resistance.

The compositions of the invention contain an aromatic polyamide which is soluble in organic solvents and from 0.01 to 30% by weight, preferably from 0.01 to 10, in particular from 0.1 to 5, % by weight, based on the weight of the structure, of an organic or organometallic charge control agent.

The compositions of the invention are suitable in particular for producing formed structures where the stability of electrostatic charges is an important aspect of their use.

The term "formed structures" as used herein is to be understood in its widest sense. It thus comprehends any shaped or formed article obtainable by any shaping or forming process on the material to be used according to the invention.

Preferably the formed structures are films or in particular fibers.

The term "fiber" is for the purposes of the present invention likewise to be understood in its broadest meaning; it thus includes for example filaments or staple fibers of any desired linear density.

The term "film" is for the purposes of the present invention likewise to be understood in its widest sense; it thus includes for example embodiments of differing thickness or function, such as membranes, coatings or in particular sheets.

An aromatic polyamide which is soluble in organic solvents comprehends for the purposes of this invention all polymers with repeating structural units of the formulae I, optionally II and optionally III $$-OC-Ar^1-CO-NH-Ar^2-NH- \quad (I),$$

-OC-Ar¹-CO-NH-Ar³-NH-  (II),

-OC-Ar¹-CO-NH-Ar⁴-NH-  (III), where $Ar^1$, $Ar^2$, $Ar^3$ and $Ar^4$ are each independently of the others a bivalent monocyclic or polycyclic aromatic radical whose free valences are disposed para or meta or comparably parallel, coaxial or kinked to each other, $Ar^3$ and $Ar^4$ or $Ar^2$, $Ar^3$ and $Ar^4$, if present in a polymer molecule, each have different individual case meanings within the scope of the given definitions, and the respective monomer building blocks underlying the polymer are selected so as to produce an aromatic polyamide which is soluble in organic solvents.

A soluble aromatic polyamide is for the purposes of the present invention an aromatic polyamide which has a solubility in N-methylpyrrolidone of at least 50 g/l at 25° C.

The organic solvent is not subject to any restrictions as long as the aromatic polyamide is soluble therein. Preference is given to using an organic solvent of the polar and aprotic type, in particular a solvent of the amide type, e.g. N-methyl-2-pyrrolidone, N,N-dimethylacetamide, N,N-dimethylformamide, tetramethylurea, N-methyl-2-piperidone, N,N'-dimethylethyleneurea, N,N,N',N'-tetramethylmaleimide, N-methylcaprolactam, N-acetylpyrrolidine, N,N-diethylacetamide, N-ethyl-2-pyrrolidone, N,N'-dimethylpropionamide, N,N-dimethylisobutylamide, N-methylformamide, N,N'-dimethylpropyleneurea.

Preference is given to using aromatic polyamides which are soluble in polar aprotic solvents and which have at least two, in particular three, repeating diamine units.

Particularly preferably the aromatic polyamides which are soluble in organic solvents are polymers with repeating structural units of the above-defined formulae I, II and III where $Ar^1$ is a bivalent monocyclic or polycyclic aromatic radical whose free valences are disposed para or comparably parallel or coaxial to each other, $Ar^2$ is a bivalent monocyclic or polycyclic aromatic radical whose free valences are disposed para or comparably parallel or coaxial to each other, $Ar^3$ is a radical of the formula IV -Ar⁵-X-Ar⁶-  (IV)

where $Ar^5$ and $Ar^6$ are each independently of the other a bivalent monocyclic or polycyclic aromatic radical whose free valences are disposed pard or comparably parallel or coaxial to each other or where $Ar^6$ additionally is a bivalent monocyclic or polycyclic aromatic radical whose free valences are disposed meta or comparably kinked to each other, X is a group of the formula —O—, —S—, —SO₂—, —O—phenylene—O— or alkylene, and where $Ar^4$ has one of the meanings defined for $Ar^2$ or $Ar^3$ but differs from the particular $Ar^2$ or $Ar^3$ of a molecule.

In a further preferred embodiment, the aromatic polyamide which is soluble in organic solvents is a polymer with the repeating structural units of the above-defined formula I where $Ar^1$ is a bivalent monocyclic or polycyclic aromatic radical whose free valences are disposed meta or comparably kinked to each other, and $Ar^2$ is a bivalent monocyclic or polycyclic aromatic radical whose free valences are disposed meta or comparably kinked to each other.

Any bivalent aromatic radicals whose valence bonds are disposed pard or comparably coaxial or parallel to each other are monocyclic or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused to one another or be bonded linearly to one another via C—C bonds or via —CO—NH— groups.

The valency bonds in coaxial or parallel disposition point in opposite directions. An example of coaxial bonds pointing in opposite directions are the bonds of 4,4'-biphenylylene. An example of parallel bonds pointing in opposite directions are the bonds of 1,5- or 2,6-naphthylene, whereas the bonds of 1,8-naphthylene are parallel but point in the same direction.

Examples of preferred bivalent aromatic radicals whose valence bonds are disposed para or comparably coaxial or parallel to each other are monocyclic aromatic radicals having free valences disposed para to each other, especially 1,4-phenylene, or bicyclic fused aromatic radicals having parallel bonds pointing in opposite directions, especially 1,4-, 1,5- and 2,6-naphthylene, or bicyclic aromatic radicals linked by a C—C bond and having coaxial bonds pointing in opposite directions, especially 4,4'-biphenylylene.

Any bivalent aromatic radicals whose valence bonds are disposed meta or comparably kinked to each other are monocyclic or polycyclic aromatic hydrocarbon radicals or heterocyclic aromatic radicals which can be monocyclic or polycyclic. Heterocyclic aromatic radicals have in particular one or two oxygen, nitrogen or sulfur atoms in the aromatic nucleus.

Polycyclic aromatic radicals can be fused with one another or be bonded to one another via C—C bonds or via bridging groups such as —O—, —CH₂—, —S—, —CO— or —SO₂—.

Examples of preferred bivalent aromatic radicals whose valence bonds are disposed meta or comparably kinked to each other are monocyclic aromatic radicals having free valences disposed meta to each other, especially 1,3-phenylene, or bicyclic fused aromatic radicals having mutually kinked bonds, especially 1,6- or 2,7-naphthylene, or bicyclic aromatic radicals linked via a C—C bond and having mutually kinked bonds, especially 3,4'-biphenylylene.

Minor proportions, for example up to 5 mol % of the monomer units, based on the polymer, can be aliphatic or cycloaliphatic in nature, for example alkylene or cycloalkylene units.

Alkylene is to be understood as meaning branched and especially straight-chain alkylene, for example alkylene having two to four carbon atoms, especially ethylene.

Cycloalkylene radicals are for example radicals having five to eight carbon atoms, especially cycloalkylene.

All these aliphatic, cycloaliphatic or aromatic radicals can be substituted by inert groups. These are substituents which have no adverse effect on the contemplated application, in particular the charge stability.

Examples of such substituents are alkyl, alkoxy or halogen.

Alkyl is to be understood as meaning branched and especially straight-chain alkyl, for example alkyl having one to six carbon atoms, especially methyl.

Alkoxy is to be understood as meaning branched and especially straight-chain alkoxy, for example alkoxy having one to six carbon atoms, especially methoxy.

Halogen is for example fluorine, bromine or in particular chlorine.

Preference is given to using aromatic polyamides based on unsubstituted radicals.

Particularly preferred radicals $Ar^1$ to $Ar^6$ are 1,4-phenylene or 1,3-phenylene.

X is preferably —O—, —$CH_2$— or —O—1,4-phenylene—O—.

The dicarboxylic acid unit in the aromatic polyamides comprising the repeating structural units of the formulae I, II and III is preferably terephthalic acid.

Examples of preferred diamine combinations from which these preferred repeating structural units of the formulae I, II and III are derived are 1,4-phenylenediamine, 4,4'-diaminodiphenylmethane and 3,3'-dichloro-, 3,3'-dimethyl- or 3,3'-dimethoxybenzidine; and also 1,4-phenylenediamine, 1,4-bis(aminophenoxy)benzene and 3,3'-dichloro-, 3,3'-dimethyl- or 3,3'-dimethoxybenzidine; and also 1,4-phenylenediamine, 3,4'-diaminodiphenyl ether and 3,3'-dichloro-, 3,3'-dimethyl- or 3,3'-dimethoxybenzidine, and also 1,4-phenylenediamine, 3,4'-diaminodiphenyl ether and 4,4'-diaminobenzanilide; and also 1,4-phenylenediamine, 1,4-bis(aminophenoxy)benzene and 3,4'-diaminodiphenyl ether.

Aramids which are derived from such diamine combinations and which are preferable for use according to the present invention are described in EP-A-199,090, EP-A-364,891, EP-A-394,892, EP-A-394,893 and EP-A-424,860.

Further preferred aromatic polyamides for use according to the present invention are polymers with the repeating structural units of the formula I where $Ar^1$ and $Ar^2$ are each 1,3-phenylene.

Very particular preference is given to using aromatic copolyamides with repeating structural units of the formulae I, II and III where $Ar^1$ is 1,4-phenylene, $Ar^2$ is 1,4-phenylene or a bivalent radical of 4,4'-diaminobenzanilide, $Ar^5$ and $Ar^6$ are each 1,4-phenylene, X is —O—, —$CH_2$— or —O—1, 4-phenylene—O— and $Ar^4$ is a bivalent radical of 3,3'-dichlorobenzidine, of 3,3'-dimethylbenzidine, of 3,3'-dimethoxybenzidine or of 3,4'-diaminodiphenyl ether.

The aromatic polyamides to be used according to the invention are known per se and can be prepared by methods known per se.

Fibers for the purposes of the present invention are endless or continuous filament fibers or staple fibers, preferably having staple lengths from 0.5 to 50 mm, or pulp.

Preference is given to fibers according to the invention which have a particularly large surface area, i.e. fine linear densities, for example below 2 dtex, or multilobal profile fibers, for example multi-edged or star-shaped profiles or for example ribbon or dumbbell profiles.

The fibers can be present in all processing states, for example as monofilaments, as an aggregate or staple, as a pulp slurry, as linear structures such as spun fiber yarn, multifilament yarn, tows, stretch-broken tows or as sheetlike structures composed of staple or continuous filament fibers, such as roller or flat card webs, laid fabrics, woven fabrics or knitted fabrics.

Particular preference is given to the fibers of the invention in the form of multifilament yarns, tows and webs.

This invention relates not only to the uncharged structures and products formed from these structures, for example yarns, tows or nonwovens, but also to the electrostatically charged ones. It is immaterial in this connection whether the charge was applied specifically (e.g. by corona discharge) or arose through triboelectric effects.

While the improved electrical properties of the structures of the invention are essentially due to the characteristic electret behavior of the material used for their production, the application advantages result in their entirety from the advantageous combination of electrical, mechanical and shape-based properties.

The improvement in the charge stability naturally correlates within certain limits with the concentration of the charge control agent in the material of the structures according to the invention.

The concentration is set so that the structures show over conventional ones an adequate improvement in the electrical properties while retaining good mechanical properties.

The electret structures of the invention surprisingly show a high triboelectric effect and/or a high charge stability. As a result, for example, a dust filter consisting of these structures, in particular fibers, or comprising these fibers will even without separate electric charging (for example through a corona discharge) achieve, on being exposed to the through-flow of gases (for example in use) or through friction against other kinds of solid materials, an appreciably higher electrostatic charge—and hence a significantly better particle collection rate—than an identically constructed dust filter composed of normal fibers.

The structures of the invention generally consist predominantly of the aromatic polyamide, but may contain other, additional substances, such as inorganic additives, which are customarily present in such polymer compositions, such as synthetic fiber materials, for the purpose of imparting special properties.

The aromatic polyamides of which the material to be used according to the invention is predominantly composed generally have inherent viscosities from about 2.5 to 7.0 dl/g.

The inherent viscosity is given by the expression:

$$\eta_{inh} = \frac{\ln \eta_{rel}}{c}$$

where $\eta_{rel}$ is the relative viscosity and c is the concentration in g/100 ml. For the purposes of the present invention the inherent viscosity is determined on solutions of 0.5 g of polymer in 100 ml of 98% strength by weight sulfuric acid at 25° C.

The aromatic polyamide of the material to be used according to the invention is usually solvent-spinnable.

The aromatic polyamides formed from solutions by dry or in particular wet forming processes permit the use even of less thermally stable charge control agents, since solvent spinning is usually carried out at lower temperatures than melt spinning.

The material of the structures of the invention, especially electret fibers, comprises a charge control agent as present in toners for electrophotographic processes.

Charge control agents for electrophotographic processes are known in large numbers from the patent literature.

Accordingly, the material includes as the charge control agent preferably one or different compounds of the following classes:

triphenylmethanes; ammonium and immonium compounds; fluorinated ammonium and immonium compounds; biscationic amides; polymeric ammonium compounds; diallylammonium compounds; aryl sulfide derivatives; phenol derivatives; phosphonium compounds and fluorinated phosphonium compounds; calix(n)arenes; metal complex compounds; benzimidazolones; or azines, thiazines or oxazines listed in the Colour Index as Pigments, Solvent Dyes, Basic Dyes or Acid Dyes.

Charge control agents which are present in the compositions of the invention individually or in combination with one another and confer very good electret properties on said compositions are in particular:

1. Triarylmethane derivatives such as:

Colour Index Pigment Blue 1, 1:2, 2, 3, 8, 9, 9:1, 10, 10:1, 11, 12, 14, 18, 19, 24, 53, 56, 57, 58, 59, 61, 62, 67 or for example Colour Index Solvent Blue 2, 3, 4, 5, 6, 23, 43, 54, 66, 71, 72, 81, 124, 125, and the triarylmethane compounds listed in the Colour Index under Acid Blue and Basic Dye, if they are suitable with respect to their temperature stability and processability, such as Colour Index Basic Blue 1, 2, 5, 7, 8, 11, 15, 18, 20, 23, 26, 36, 55, 56, 77, 81, 83, 88, 89, Colour Index Basic Green 1, 3, 4, 9, 10, in turn Colour Index Solvent Blue 125, 66 and 124 being very particularly suitable. Colour Index Solvent Blue 124 in the form of its highly crystalline modification is very particularly suitable. Further examples of charge control agents of the triphenylmethane series, which are very suitable for the production of electret fibers according to the invention, are those compounds described in DE-C-1 919 724 and DE-C- 1 644 619.

In addition, triphenylmethanes as described in U.S. Pat. No. 5,051,585, in particular those of the formula I

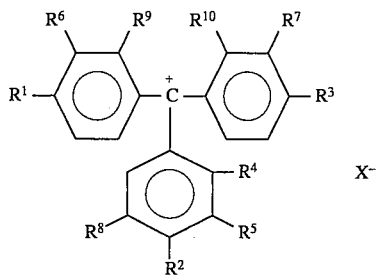
(1)

in which
$R^1$ and $R^3$ are identical or different and are —$NH_2$, a mono- or dialkylamino group, the alkyl groups of which have 1–4, preferably 1 or 2, carbon atoms, a mono- or di-omega-hydroxyalkylamino group, the alkyl groups of which have 2–4, preferably 2, carbon atoms, an unsubstituted or N-alkylsubstituted phenyl- or phenalkylamino group, the alkyl of which has 1–4, preferably 1 or 2, carbon atoms, the phenalkyl group of which has 1 to 4, preferably 1 or 2, carbon atoms in the aliphatic bridge and the phenyl nucleus of which can carry one or two of the following substituents: alkyl having 1 or 2 carbon atoms, alkoxy having 1 or 2 carbon atoms and the sulfonic acid group,
$R^2$ is hydrogen or has one of the meanings mentioned for $R^1$ and $R^3$,
$R^4$ is hydrogen, halogen, preferably chlorine, or a sulfonic acid group or forms together with $R^5$ a fused-on phenyl ring,
$R^5$ forms together with $R^4$ a fused-on phenyl ring,
$R^6$, $R^7$, $R^9$ and $R^{10}$ are each hydrogen or an alkyl radical having 1 or 2 carbon atoms, preferably methyl and
$R^8$ is hydrogen or halogen, preferably chlorine, and
$X^-$ is one equivalent of an anion, in particular a chloride, sulfate, tetrachloroaluminate molybdate, phosphomolybdate or borate anion such as tetrafluoroborate or tetraphenylborate.

A charge control agent of the formula (1) is particularly preferred in which $R^1$ and $R^3$ are phenylamino groups, $R^2$ is an m-methylphenylamino group and the radicals $R^4$ to $R^{10}$ are all hydrogen.

2. Ammonium and immonium compounds as described in U.S. Pat. No. 5,015,676.

3. Fluorinated ammonium and immonium compounds as described in U.S. Pat. No. 5,069,994, in particular those of the formula 3

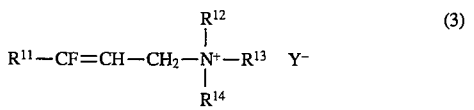
(3)

in which
$R^{11}$ is perfluorinated alkyl having 5–11 carbon atoms,
$R^{12}$, $R^{13}$ and $R^{14}$ are identical or different and are alkyl having 1–5, preferably 1–2, carbon atoms,
$Y^-$ is one equivalent of an anion, preferably a tetrafluoroborate or tetraphenylborate anion.
Preferably,
$R^{11}$ is perfluorinated alkyl having 5–11 carbon atoms,
$R^{12}$ and $R^{13}$ are ethyl and
$R^{14}$ is methyl 4. Biscationic acid amides as described in PCT-A-91/10172, in particular those of the formula 4

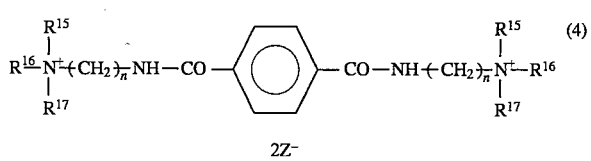
(4)

in which
$R^{15}$, $R^{16}$ and $R^{17}$ are identical or different alkyl radicals having 1–5 carbon atoms, preferably methyl,
n is an integer from 2 to 5,
and $Z^-$ is one equivalent of an anion, preferably a tetraphenylborate anion.

5. Diallylammonium compounds as described in DE-A-4 142 541, in particular those of the formula (5)

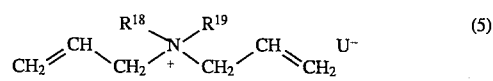
(5)

in which
$R^{18}$ and $R^{19}$ are identical or different alkyl groups having 1–5, preferably 1 or 2, carbon atoms, but in particular are methyl groups and $U^-$ is one equivalent of an anion, preferably a tetraphenylborate anion, and the polymeric ammonium compounds of the formula (6) (as described in DE-A-4 029 652 or DE-A-4 103 610) obtainable from these,

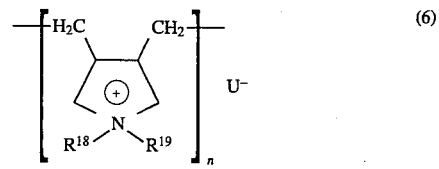
(6)

in which n has a value which corresponds to molecular weights from 5,000 to 500,000. However, compounds of the formula (6) having molecular weights from 40,000 to 400,000 are particularly preferred.

6. Aryl sulfide derivatives as described in DE-A-4 031 705, in particular those of the formula (7)

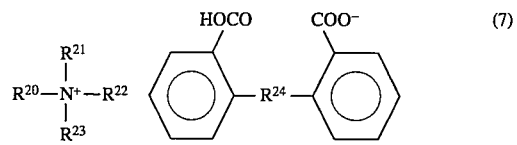
(7)

in which
$R^{20}$, $R^{21}$, $R^{22}$ and $R^{23}$ are identical or different alkyl groups having 1–5, preferably 2 or 3, carbon atoms and
$R^{24}$ is one of the divalent radicals —S—, —S—S—, —SO— or —$SO_2$—. For example, $R^{20}$ to $R^{23}$ are propyl groups and $R^{24}$ is the group —S—S—.

7. Phenol derivatives as described in EP-A-0 258 651, in particular those of the formula (8)

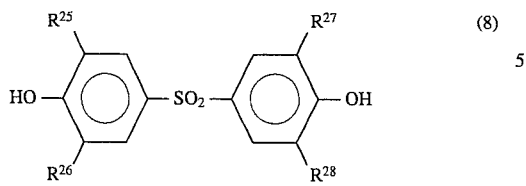

in which
$R^{25}$ and $R^{27}$ are alkyl or alkenyl groups having 1 to 5, preferably 1 to 3, carbon atoms and $R^{26}$ and $R^{28}$ are hydrogen or alkyl having 1 to 3 carbon atoms, preferably methyl.

Examples which can be mentioned are the compounds in which $R^{25}$ to $R^{28}$ are methyl groups or in which $R^{26}$ and $R^{28}$ are hydrogen and $R^{25}$ and $R^{27}$ are the group —$CH_2$—$CH$=$CH_2$.

8. Phosphonium compounds and fluorinated phosphonium compounds as described in U.S. Pat. No. 5,021,473 and in U.S. Pat. No. 5,147,748, in particular those of the formulae (9)

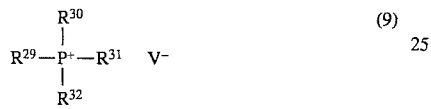

in which
$R^{29}$, $R^{30}$, $R^{31}$ and $R^{32}$ are identical or different alkyl groups having 1–8, preferably 3 to 6, carbon atoms and $V^-$ is one equivalent of an anion, preferably a halide anion and (10)

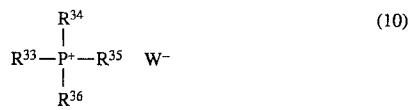

in which
$R^{33}$ is a highly fluorinated alkyl radical having 5–15, preferably 6–10, carbon atoms,
$R^{34}$, $R^{35}$ and $R^{36}$ are alkyl having 3–10 carbon atoms or phenyl and
$W^-$ is the equivalent of an anion.

An example of a compound of the formula (9) which can be mentioned is tetrabutylphosphonium bromide, examples of compounds of the formula (10) which can be mentioned are the compounds having $R^{33}$=$C_8F_{17}$—$CH_2$—$CH_2$—, $R^2$=$R^3$=$R^4$=phenyl and $W^-$=$PF_6$— or the tetraphenylborate anion.

9. Calix(n)arenes as described in EP-A-0 385 580 and EP-A-0 514 867 and as described in EP-A-0 516 434, in particular those of the formula (11)

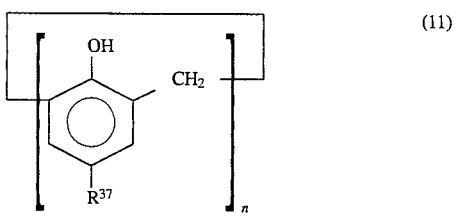

in which
$R^{37}$ is hydrogen, halogen, preferably chlorine, straight-chain or branched alkyl having 1–12 carbon atoms, aralkyl, e.g. benzyl or phenethyl, cyclohexyl, —$NO_2$, —$NH_2$, —$NHR^{38}$ or $NR^{38}R^{39}$, in which $R^{38}$ and $R^{39}$ are each alkyl having 1–8 carbon atoms, unsubstituted or substituted phenyl or —$Si(CH_3)_3$.

10. Metal complex compounds, such as chromium azo complexes, cobalt azo complexes, iron azo complexes, zinc azo complexes or aluminum azo complexes or chromium salicylic acid complexes, cobalt salicylic acid complexes, iron salicylic acid complexes, zinc salicylic acid complexes or aluminum salicylic acid complexes of the formulae (12), (13) and (14)

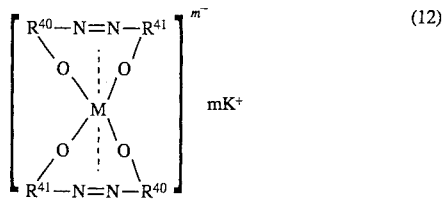

in which
M is a 2-valent or 3-valent metal atom, preferably chromium, cobalt, iron, zinc or aluminum,
$R^{40}$ and $R^{41}$ are each two-bonded aromatic rings, preferably of the formulae

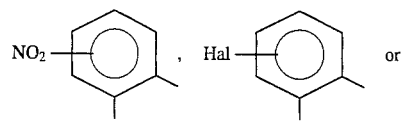

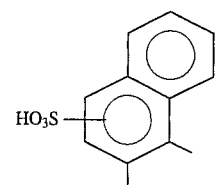

Hal is halogen, m is one of the numbers 1 or 2 and $K^+$ is one equivalent of a cation,

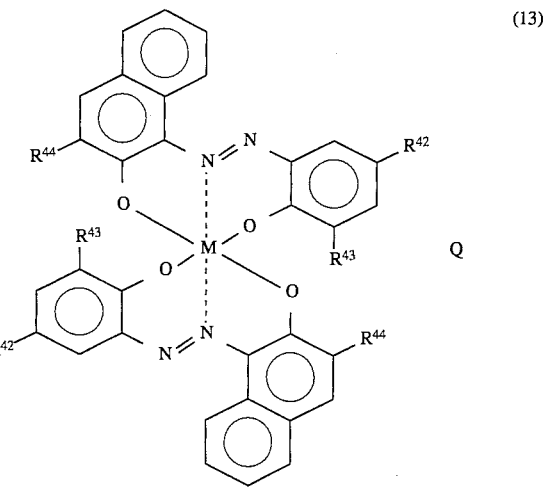

in which
M is a 2-valent or 3-valent metal atom, preferably chromium, cobalt, iron,
$R^{42}$ is hydrogen, halogen, preferably Cl, nitro or amidosulfonyl,
$R^{43}$ is hydrogen or nitro,
$R^{44}$ is hydrogen, the sulfonic acid group, —CO—NH—$R^{45}$, in which $R^{45}$=phenyl, alkyl having 1–5 carbon atoms, which can be unsubstituted or substituted by a mono-, di- or trialkylamino group and
Q is a counter-ion which makes the complex neutral, preferably a proton, an alkali metal ion or an ammonium ion,

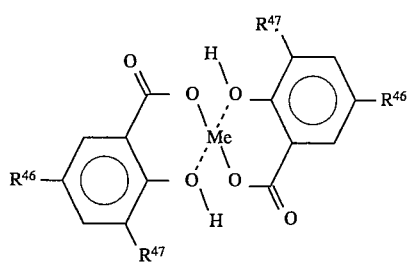

(14)

in which

M is a divalent metal atom, preferably a zinc atom, $R^{47}$ and $R^{46}$ are identical or different, straight-chain or branched alkyl groups having 1–8, preferably 3–6, carbon atoms, for example tert-butyl.

Such compounds are described in EP-A-0 162 632, U.S. Pat. No. 4,908,225, EP-A-0 393 479, EP-A-0 360 617, EP-A-0 291 930, EP-A-0 280 272, EP-A-0 255 925, EP-A-0 251 326, EP-A-0 180 655, EP-A-0 141 377, U.S. Pat. No. 4,939,061, U.S. Pat. No. 4,623,606, U.S. Pat. No. 4,590,141 and/or characterized by the CAS numbers 31714-55-3, 104815-18-1, 84179-68-8, 110941-75-8, 32517- 36-5, 38833-00-00, 95692-86-7, 85414-43-3, 136709-14-3, 135534-82-6, 135534-81-5, 127800-82-2, 114803-10-0, 114803-08-6.

Examples of particularly preferred metal complex compounds of the above formula 13 are given in the following table:

TABLE

| $R^{42}$ | $R^{43}$ | $R^{44}$ | $R^{45}$ | M | Q |
|---|---|---|---|---|---|
| Cl | H | H | — | Cr | $H^+$ |
| $NO_2$ | $NO_2$ | —$CONHR^{45}$ | Phenyl | Cr | $H^+/Na^+/NH_4^+$ |
| Cl | H | —$CONHR^{45}$ | Phenyl | Fe | $H^+/Na^+/NH_4^+$ |
| Cl | H | —$CONHR^{45}$ | -$(CH_2)_3$-$N^+(CH_3)_3$ | Cr | $Cl^-$ |
| —$SO_2NH_2$ | H | H | — | Co | $H^+/Na^+/NH_4^+$ |

11. Benzimidazolones as described in EP-A-0 347 695, in particular those of the formula (15)

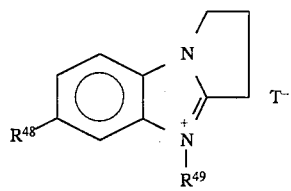

(15)

in which
$R^{48}$ is alkyl having 1–5 carbon atoms and $R^{49}$ is alkyl having 1–12 carbon atoms and T is one equivalent of an anion, in particular a chloride or tetrafluoroborate anion.

An example which can be mentioned is the compound having $R^{48}=CH_3$ and $R^{49}=C_{11}H_{23}$ or azines of the following Colour Index numbers: C.I. Solvent Black 5, 5:1, 5:2, 7, 31 and 50; C.I. Pigment Black 1, C.I. Basic Red 2 and C.I. Basic Black 1 and 2 and C.I. Oxidation Base 1; or thiazines of the following Colour Index numbers: C.I. Basic Blue 9, 24 or 25 and C.I. Solvent Blue 8; or oxazines of the Colour Index numbers C.I. Pigment Violet 23, C.I. Basic Blue 3, 10 or 12; and also the azines, thiazines and oxazines listed in the Colour Index under Basic Dye or Acid Dye.

The material preferably contains, as charge control agent, one or more various compounds selected from the following classes:

Triphenylmethanes of the formula (1); fluorinated ammonium compounds of the formula (3); diallylammonium compounds of the formula (5) and the polymeric ammonium compounds of the formula (6) obtainable therefrom; aryl sulfide derivatives of the formula (7); metal complex compounds of the formulae (12) and (13).

Particular preference is given to compositions according to the invention which include, as charge control agent, a compound of the formula (I) in which $R^1$ and $R^3$ are each phenylamino and $R^2$ is 3-methylphenylamino and $X^-$ is one sulfate equivalent. This compound, known as C.I. Solvent Blue 124, conforms to the following formula (16):

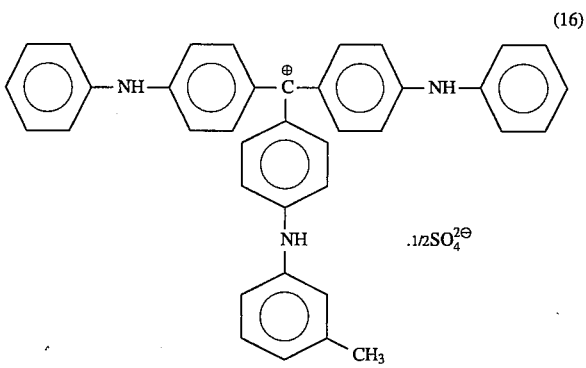

(16)

Particular preference is also given to compositions according to the invention which include as charge control agent a compound of the formula (3) where $R^{11}$ is a perfluorinated alkyl radical having 5 to 11 carbon atoms and $Y^-$ is tetraphenylborate or tetrafluoroborate, or a compound of the formula (5) or (6) where $R^{18}$ and $R^{19}$ are each methyl and $U^-$ is a tetraphenylborate anion.

Particular preference is further given to compositions according to the invention which include as charge control agent a compound of the formula (7) where $R^{20}$, $R^{21}$, $R^{22}$ and $R^{23}$ are each propyl and $R^{24}$ is a disulfide bridge or of the formula (13) where $R^{42}$ is chlorine, $R^{43}$ is hydrogen and Q is a proton.

The many possible applications of the electret structures according to the invention are made possible by the combination of the above-described material composition with the electret structure properties, especially the textile property data of the fibers to be established by the conditions employed during shaping. It is surprising that the electret fibers can be produced with virtually the same spectrum of textile properties as the fibers which were produced from the corresponding polymer without addition of charge control agent.

The fibers of the invention customarily have breaking strengths from 25 to 280 cN/tex, breaking extensions from 2 to 10% and initial moduli from 20 to 150 N/tex.

The textile properties, such as breaking strength, extension and initial modulus, can be controlled as required in the course of the production process by controlling the polymer composition and the drawing conditions.

The electret fibers of the invention can have a spin finish addon from 0 to 0.3% by weight, preferably from 0 to 0.2% by weight. A preferred embodiment of spin finished electret fibers according to the invention is that they have been given a hydrophobic spin finish, in particular one which includes as the hydrophobicizing agent a wax, a fluorosurfactant and/or a fluoropolymer, e.g. polytetrafluoroethylene.

As already indicated above, the electret structures of the invention can be present in various forms as linear or sheetlike structures. More particularly, they can be present in the form of multifilament yarns, tows and webs.

Of course, the fibers of the invention can also be present in mixtures with other synthetic or else natural fibers, in which case the non-electret fibers can differ from the fibers of the invention not only in respect of their electrical properties but also in respect of their customary textile properties, such as breaking strength, breaking extension, shrinkage behavior, etc.

The webs composed of the fibers of the invention are a particularly useful embodiment of the invention, since they can be used in particular as filter material.

The structures of the invention, in particular electret fibers, can of course also be present in combination with a non-electret material to form a structure having two or more components.

The copolymerization of the aromatic polyamides to be formed according to the invention is generally carried out as a solution polymerization.

For this, the aromatic monomeric compounds to be reacted with one another are generally dissolved in an organic solvent. This organic solvent preferably comprises at least one solvent of the amide type, as described above.

The preferred organic solvents for the process of the invention are N-methyl-2-pyrrolidone, N,N-dimethylacetamide and a mixture thereof.

In a preferred form of carrying out the solution polymerization, the aromatic monomeric diamines are dissolved in an amide solvent. The solution thus obtained is then vigorously mixed with at least one aromatic monomeric compound in the form of an aromatic dicarbonyl dihalide to initiate the polycondensation.

In effect the amide solvent is used not only as the solvent for the aromatic monomeric compounds and the aromatic polyamide obtained therefrom but also as the acid acceptor for a hydrogen halide, for example for hydrogen chloride, which is formed as a byproduct of the polycondensation of the aromatic monomeric compounds. In some cases it can be advantageous to use a solubility-promoting additive, for example a metal halide of one of the metals of group I or group II of the Periodic Table, which is added to the polycondensation mixture before, during or after the polycondensation.

Examples of such additives are alkali metal halides, such as lithium chloride, or alkaline earth metal halides, such as calcium chloride.

The polycondensation temperatures customarily range in the case of a solution polymerization between −20° and +120° C., preferably between +10° and +100° C. Particularly good results are obtained at reaction temperatures between +10° and +80° C.

The sum of the concentrations of the aromatic monomeric compounds in the polycondensation mixture solution can be set having regard to the desired degree of polycondensation, the viscosity desired for the polymerization mixture, the nature of the aromatic monomeric compounds used, the nature of the solvent used and the desired polycondensation temperature. The most favorable sum of the concentrations can be determined on the basis of a number of preliminary experiments on the course of the polycondensation.

Polycondensation reactions are preferably carried out in such a way that, after the reaction has ended, from 2 to 15, preferably from 5 to 12, % by weight of polycondensate are present in the solution.

The increase in the molecular weight of the polymer in the course of the polycondensation also results in an increase in the viscosity of the reaction batch.

Once the polymer solution has reached the viscosity required for further processing, the polycondensation can be terminated in a conventional manner through the addition of monofunctional compounds, e.g. acetyl chloride. Then the hydrogen chloride formed, which is present as a salt with the amide solvent, can be neutralized through the addition of basic substances.

Suitable for the purpose are for example lithium hydroxide, calcium hydroxide, but in particular calcium oxide.

The aromatic polyamide obtained on carrying out the production process can be collected from the polycondensation mixture by a separating process, for example by precipitation. To produce a solution for forming the polyamide, the aromatic polyamide thus isolated is then dissolved in a suitable organic solvent.

In those cases where the aromatic polyamide was prepared using the method of solution polycondensation, the polyamide, being highly soluble in the solvent used for the polycondensation, is completely dissolved therein. In an industrial use of the production process it is therefore advantageous to use the mixture obtained in the polycondensation as forming solution for the aromatic polyamide.

In the process for preparing the forming solution for the aromatic polyamide, the solvent used is preferably a solvent of the amide type, in particular one of the abovementioned solvents of the amide type or a mixture of two or more of said compounds.

To prepare the forming solution it is advantageous to maintain the concentration of the aromatic polyamide within a range between 4 and 15% by weight, in particular between 5 and 12% by weight. If necessary, the spinning solution can contain a solubility-promoting additive, in which case at least one metal halide of a metal of groups I and II of the Periodic Table can be used, for example lithium chloride, calcium chloride or magnesium bromide, in a concentration between 0.2 and 10%, preferably between 0.5 and 5%, based on the total weight of the forming solution. This solubility-promoting additive also enhances the stability of the forming solution at elevated temperature.

The charge control agents can be incorporated into the forming solution either dissolved or suspended or dispersed in the respective solvent, in which case the charge control agents can also be coated onto a suitable material or incorporated into a suitable binder.

The incorporation of the charge control agents can take place in the forming solution of solvent and aromatic polyamide or in the course of the solution polycondensation of the aromatic polyamide.

The forming of the forming solution to form the formed structures of the invention can be carried out by any suitable dry process, wet process or dry-wet process. In those cases where a wet process is used, the forming solution is extruded through a die, for example a spinneret, into a coagulating liquid. It is usually advantageous in this connection for the coagulating liquid to comprise water or a water-containing solution of polar organic solvent. This polar organic solvent can be selected from the same amide solvents which are usually used for dissolving the aromatic polyamide.

The polar organic solvent used in the coagulation liquid is preferably the same solvent as is present in the forming solution. The coagulation liquid is preferably used at a temperature between 0° C. and the boiling point of the coagulation liquid at atmospheric pressure.

The polar organic solvent is preferably present in the coagulation liquid in a concentration of less than 70% by weight, in particular less than 50% by weight.

In the production of fibers from the aromatic polyamide, the spinning solution is extruded through a spinning pack having one or more orifices, the filamentary streams of the spinning solution being solidified in one of the above-indicated coagulation liquids (wet process) or in an evaporation-promoting atmosphere (dry process). A similarly useful variant is the dry-jet wet spinning process as described for example in U.S. Pat. No. 3,414,645. The spinning apparatus used can be a customary horizontal or vertical wet spinning machine, a dry-jet wet spinning machine or a spinning machine in which the material flows downward under tension.

In the wet spinning of an aromatic polyamide according to the invention, the coagulation is preferably effected using a coagulation liquid comprising a coagulation-promoting additive, and this coagulation is followed by a further coagulation step whereby the coagulating filaments of the aromatic copolyamide are passed into a waterbath maintained at a temperature between 0° and 100° C.

The additional coagulation step serves to complete the coagulation by removing the solvent. Moreover, the coagulation-promoting additives, if such substances are used, are washed out of the coagulated filaments.

It is clear from the foregoing that the aromatic copolyamide of the invention is easy to process into formed structures analogously to customary forming processes and apparatus without the use of a dangerous or harmful solvent such as concentrated sulfuric acid. This reduces the risk to the workers.

The formed structures produced according to the invention are usually subjected to a drawing process which promotes not only the mechanical properties, such as the tensile strength and the modulus of elasticity, but also the thermal properties, for example the thermal stability, of the structures thus produced.

Filaments are generally drawn to enhance the mechanical strength and the modulus of elasticity. The draw ratio employed customarily ranges from about 1:2 to 1:20. The drawing temperature is generally between 200° and 500° C., preferably between 300° and 480° C.

Drawing can be carried out in a single or in two or more steps, and a hot plate or a cylindrical heater can be used. In addition, the drawn filaments can be subjected to a further heat treatment at the same or at a higher temperature in order that their crystalline structure may be enhanced.

The present invention also provides a process for producing the formed structures of the invention, comprising the steps of a) preparing a forming solution comprising an organic solvent, an aromatic polyamide which is soluble in organic solvents, and from 0.01 to 30% by weight, based on the weight of the solids, of an organic or organometallic charge control agent, b) extruding the forming solution through a die plate which contains orifices in a predetermined number and shape so as to produce the desired formed structure, and c) removing the organic solvent in a manner known per se so as to produce a lower-solvent or solvent-free formed structure of adequate mechanical stability and nontackiness for further processing.

Step c) can comprise evaporating the solvent using elevated temperature to form a lower-solvent formed structure of adequate mechanical stability and nontackiness for further processing (dry forming process).

Preferably the primary formed structure is introduced in step c) into a bath comprising a coagulation liquid so that the organic solvent is removed from said primary formed structure and the desired formed structure is produced by coagulation of the primary structure and has adequate mechanical stability for further processing (wet forming process).

The introducing can be effected by direct extruding into a coagulation liquid or by extruding into a coagulation liquid after passage through an air gap of predetermined length.

The electret fibers of the invention can also be provided with any known texturing. For instance, it is possible to subject the filaments, preferably in tow form, to stuffer box crimping.

A particularly preferred form of the fibers according to the invention is, as mentioned above, the form of webs.

This is because these webs can be used with particular advantage for the production of highly effective and particularly long-lived dust filters, especially fine dust filters.

It has surprisingly been found that high textile properties, in particular stability, and a very variable construction can be successfully combined with a very considerable increase in the half-life of the electric charge and/or a high triboelectric charge if the fiber material of the nonwoven comprises or consists of fibers according to the invention.

The present invention accordingly provides a nonwoven which consists of or comprises synthetic fibers and is at least in part composed of fibers according to the invention.

The proportion in the nonwoven of the electret fibers according to the invention which imparts the desired combination of properties to the nonwoven can in some circumstances be surprisingly small.

Frequently there is a marked economic and technical advantage if the nonwoven contains just 10% of electret fibers according to the invention.

Generally it is advantageous to use a nonwoven containing from 50 to 100% of electret fibers, the highest technical requirement profiles naturally being achievable with 100% electret fiber nonwovens.

The linear densities of the synthetic fibers in the nonwovens according to the invention and the products optionally produced therefrom, in particular the dust filters, are in the conventional range for these applications.

From case to case it can be advantageous to use mixed linear densities; especially in the case of nonwovens which are not 100% electret fiber, the electret fibers and the normal fibers can have different linear densities.

The synthetic fibers can be continuous filament fibers or staple fibers, customarily with staple lengths from 0.2 to 200 mm.

Staple fibers with staple lengths below 20 mare advantageously processed into webs by wet laying processes, while staple fibers having staple lengths above 20 mm are advantageously processed into webs by carding.

It can further be advantageous to produce webs from mixtures of two or more types of electret fibers according to the invention, each type containing a different one of the abovementioned charge control agents.

It is of course also possible to process mixtures of electret staple fibers according to the invention and other staple fibers into a fiber web.

Processing can be as usual by dry or wet laydown. Staple fibers are generally dry laid on a roller card.

The synthetic fibers optionally included in the webs of the invention alongside the electret fibers of the invention can be made of any spinnable polymer, in particular of polyamide, polyacrylonitrile, polyethylene, polypropylene or polyester. These synthetic fibers can of course also contain organic or organometallic charge control agents as defined above.

The consolidation of the nonwovens can in principle be carried out in any known manner. For instance, it is possible to consolidate the web with a binder with which the web is impregnated and which is subsequently cured, or the binder can be a fusible binder which is incorporated into the web for example in powder form or in the form of binder threads, and which consolidates the web to the nonwoven under the action of heat.

The consolidating of the web to form the nonwoven can also be effected by calendering, in which case the effect obtained is partly a mechanical interfelting of the filaments, partly a welding together at the cross-over points.

The fusible adhesive material can of course also be introduced into the web as a component of a side-by-side bicomponent fiber or as the sheath of a core-sheath bicomponent fiber.

Of advantage are nonwovens according to the invention which have been consolidated mechanically. Mechanical consolidation is to be understood as meaning for example needling or else for example hydromechanical consolidation as described for example in EP-A-0 108 621.

The various methods of consolidation can if required also be combined.

The basis weight of the nonwovens according to the invention naturally depends on the intended use. Generally the basis weight ranges from 5 to 300 g/m$^2$, preferably from 100 to 250 g/m$^2$, but for special duties it can also be higher, for example up to 1000 g/m$^2$.

If desired, the nonwoven can also be combined with another textile material, for example a further nonwoven or a textile material of defined yarn position which likewise consists of or comprises electret fibers.

More particularly, there is occasional demand for a combination with supporting and reinforcing or else protectively covering textile materials. In a preferred embodiment, the electret fiber webs of the invention are covered on one or in particular on both sides with a protective textile material, for example a nonwoven, especially a fine web.

Especially when the webs of the invention are to be used as dust filters it is frequently advantageous to combine them with coarse or deep-bed filters.

The present invention also provides a process for producing the nonwovens of the invention by random laydown of synthetic continuous filament or staple fibers in a conventional manner (cf.: "Radko Krcema, Handbuch der Textilverbundstoffe", Deutscher Fachverlag GmbH (1970), page 53) on a moving surface or by web formation from staple fibers on a flat or roller card, subsequent consolidation, wherein at least some of the laid-down synthetic fibers are electret fibers including as the fiber-forming polymer an aromatic polyamide which is soluble in organic solvents and from 0.01 to 30% by weight, based on the weight of the fiber, of an organic or organometallic charge control agent.

In the production of nonwovens which according to the invention contain a proportion of electret fibers, a mixture of electret fibers and normal staple fibers in the desired mixing ratio can be conventionally dry- or wet-laid to form a web which is then consolidated.

The webs consisting of the electret fibers according to the invention or containing an effective proportion thereof are, as already mentioned, used with particular advantage for producing filters.

The present invention therefore also provides for this use of the electret fibers and of textile materials comprising them, especially nonwovens.

From a production point of view it can be advantageous to provide the fibers prior to web formation with an antistatic spin finish which is not washed out until the end of the production process, for example after the filters have been fabricated.

The Examples which follow illustrate the invention without limiting it.

EXAMPLES 1 to 4

Production of fibers from aromatic polyamides and charge control agents

Spinning solutions were prepared in N-methylpyrrolidone (NMP), each containing 0.06% by weight, based on the spinning solution, of an aromatic polyamide of 100 mol % of terephthaloyl chloride, 50 mol % of 3,3'-dimethylbenzidine (o-tolidine), 25 mol % of para-phenylenediamine and 25 mol % of 1,4-bis(4-aminophenoxy)benzene and in each case 2% by weight, based on the spinning solution, of calcium hydroxide or calcium chloride (Example 4) as solubilizer.

The spinning solution of Example 1 (comparative sample) contained no further additions.

The spinning solution of Example 2 additionally contained 0.06% by weight, based on the spinning solution, of a charge control agent of the above-defined formula (3) where $R^{11}$ is —$(CF_2$—$CF_2)_n$—$CF_3$ with n=2–5, $R^{12}$ and $R^{14}$ are each ethyl, $R^{13}$ is methyl and $Y^-$ is a tetraphenylborate anion.

The spinning solution of Example 3 additionally contained 0.06% by weight, based on the spinning solution, of a charge control agent of the above-defined formula (6) where $R^{18}$ and $R^{19}$ are each methyl and $X^-$ is a tetraphenylborate anion whose average molecular weight, determined via the measurement of the solution viscosity, at 25° C. is about 300,000 and which has a melting point of 225° C.

The spinning solution of Example 4 additionally contained 0.11% by weight, based on the spinning solution, of a charge control agent of the above-defined formula (16), which is known as C.I. Solvent Blue 124.

The incorporation of the charge control agent of Example 2 was effected by metering a dilute polymer solution of NMP, 2% by weight of aramid and 2.5% by weight of charge control agent, into a polymer solution of NMP and 6% by weight of aramid upstream of the spinneret in a ratio so that the above-specified amount of charge control agent in the spinning solution was obtained.

The incorporation of the charge control agent of Example 3 was effected by metering the charge control agent into the polycondensation solution in the course of the production of the aramid.

The incorporation of the charge control agent of Example 4 was effected by metering a dilute polymer solution of NMP, 2% by weight of aramid and 5% by weight of charge control agent into a polymer solution of NMP and 6% by weight of aramid upstream of the spinneret in a ratio so that the above-specified amount of charge control agent in the spinning solution was achieved.

The spinning solutions were spun wet and drawn at temperatures of 240°–250° C. in a ratio of 1:2.

The multifilaments obtained were then converged into a strand of about 10,000 dtex, crimped and cut. The length of cut was set to 37.7 mm.

The staple fibers obtained had the following properties:

Tensile strength (Examples 1–4): 65–75 cN/rex

Initial modulus (Examples 1–4): 35–40 N/rex

Filament linear density:

Example 1: 1.80 dtex +/– 0.10 dtex

Example 2: 1.86 dtex +/– 0.18 dtex

Example 3: 1.70 dtex +/– 0.20 dtex

Example 4: 1.89 dtex +/– 0.21 dtex

EXAMPLES 5 to 8

Production of webs from fibers of aromatic polyamides and charge control agents

The staple fibers produced according to Examples 1 to 4 were processed together with bicomponent fibers into webs. The filter properties of these webs were investigated.

The bicomponent fibers used were commercial grades of the core-sheath type based on polyethylene terephthalate (core) and isophthalic-modified polyethylene terephthalate (sheath) (bico ®TREVIRA 252, 3.3 dtex, 50 mm).

In each case 80% by weight of polyamide fibers and 20% by weight of bicomponent fibers were used.

Prior to the use of the bicomponent fibers they were roller-carded, washed and dried.

The production of the webs was carried out on a roller card; in each case webs having a basis weight of 200 g/m² were produced. The webs were subsequently thermally consolidated in a hot air oven at 160° C. for 3 minutes. The webs obtained comprised a combination of bicomponent fibers with unmodified aramid fibers (Example 5), a combination of bicomponent fibers with modified aramid fibers which contain the charge control agent of the formula (3) defined in Example 2 (Example 6), a combination of bicomponent fibers with modified aramid fibers which contain the charge control agent of formula (6) defined in Example 3 (Example 7), and a combination of bicomponent fibers with modified aramid fibers which contain the charge control agent of formula (16) defined in Example 4 (Example 8).

The webs obtained were investigated in respect of their separating efficiency on a commercial filter test stand Palas AFP 2000 which operates according to the principle of scattered light particle size count analysis. The following settings were used:

Flow velocity: 20 cm/sec

Particle mass concentration: 50 mg/m²

Dust impingement time: 1–10 min

Test dust: "ac fine" having the following composition:

| Particle size (µm) | Proportion (%) |
| --- | --- |
| 0.3–0.5 | 55.5 |
| 0.5–1.0 | 17.3 |
| 1.0–3.0 | 26.6 |
| 3.0–5.0 | 0.5 |
| >5.0 | not relevant |

The results of these measurements are summarized below in Tables 1–4:

TABLE 1

Separation achieved by filter comprising a combination of bicomponent fibers with unmodified aramid fibers (Example 5) after different dust impingement times

| Particle size (µm) | Separation T(x) after a dust impingement time t (min) | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| 0.3 | 0.91 | 0.91 | 0.90 | 0.89 | 0.88 | 0.88 | 0.87 | 0.87 | 0.86 | 0.86 |
| 0.5 | 0.94 | 0.94 | 0.93 | 0.92 | 0.92 | 0.91 | 0.91 | 0.91 | 0.90 | 0.90 |
| 1.0 | 0.95 | 0.95 | 0.9S | 0.94 | 0.94 | 0.94 | 0.93 | 0.93 | 0.93 | 0.93 |
| 3.0 | 0.98 | 0.99 | 0.98 | 0.98 | 0.98 | 0.98 | 0.98 | 0.98 | 0.98 | 0.98 |
| 5.0 | 1.00 | 1.00 | 1.00 | 1.00 | 1.00 | 0.99 | 1.00 | 1.00 | 1.00 | 1.00 |

TABLE 2

Separation achieved by filter comprising a combination of bicomponent fibers with modified aramid fibers containing a charge control agent of formula (3) (Example 6) after different dust impingement times

| Particle size (µm) | Separation T(x) after a dust impingement time t (min) | | | | | | | | | |
| --- | --- | --- | --- | --- | --- | --- | --- | --- | --- | --- |
| | 1 | 2 | 3 | 4 | 5 | 6 | 7 | 8 | 9 | 10 |
| 0.3 | 0.98 | 0.98 | 0.98 | 0.98 | 0.98 | 0.98 | 0.98 | 0.98 | 0.97 | 0.97 |
| 0.5 | 0.99 | 0.99 | 0.99 | 0.99 | 0.98 | 0.98 | 0.98 | 0.98 | 0.98 | 0.98 |
| 1.0 | 0.99 | 0.99 | 0.99 | 0.99 | 0.99 | 0.99 | 0.99 | 0.99 | 0.99 | 0.99 |
| 3.0 | 1.00 | 1.00 | 1.00 | 1.00 | 1.00 | 1.00 | 1.00 | 1.00 | 1.00 | 1.00 |
| 5.0 | 1.00 | 1.00 | 1.00 | 1.00 | 1.00 | 1.00 | 1.00 | 1.00 | 1.00 | 1.00 |

TABLE 3

Separation achieved by filter comprising a combination of bicomponent fibers with modified aramid fibers containing a charge control agent of the formula (6) (Example 7) after different dust impingement times

| Particle size | Separation T(x) after a dust impingement time t (min) | | | | | | | | | |
|---|---|---|---|---|---|---|---|---|---|---|
| (μm) | 1 | 2 | 3 | 4 | 5 | 6 | 7 | 8 | 9 | 10 |
| 0.3 | 0.97 | 0.97 | 0.97 | 0.97 | 0.97 | 0.96 | 0.96 | 0.96 | 0.96 | 0.96 |
| 0.5 | 0.98 | 0.91 | 0.98 | 0.98 | 0.98 | 0.98 | 0.97 | 0.97 | 0.97 | 0.97 |
| 1.0 | 0.99 | 0.99 | 0.99 | 0.99 | 0.99 | 0.99 | 0.99 | 0.99 | 0.99 | 0.99 |
| 3.0 | 1.00 | 1.00 | 1.00 | 1.00 | 1.00 | 1.00 | 1.00 | 1.00 | 1.00 | 1.00 |
| 5.0 | 1.00 | 1.00 | 1.00 | 1.00 | 1.00 | 1.00 | 1.00 | 1.00 | 1.00 | 1.00 |

TABLE 4

Separation achieved by filter comprising a combination of bicomponent fibers with modified aramid fibers containing a charge control agent of formula (16) (Example 8) after different dust impingement times

| Particle size | Separation T(x) after a dust impingement time t (min) | | | | | | | | | |
|---|---|---|---|---|---|---|---|---|---|---|
| (μm) | 1 | 2 | 3 | 4 | 5 | 6 | 7 | 8 | 9 | 10 |
| 0.3 | 0.96 | 0.96 | 0.95 | 0.95 | 0.95 | 0.94 | 0.94 | 0.94 | 0.94 | 0.94 |
| 0.5 | 0.97 | 0.97 | 0.97 | 0.96 | 0.96 | 0.96 | 0.96 | 0.95 | 0.96 | 0.95 |
| 1.0 | 0.98 | 0.98 | 0.98 | 0.97 | 0.97 | 0.97 | 0.97 | 0.97 | 0.97 | 0.97 |
| 3.0 | 0.99 | 1.00 | 1.00 | 0.99 | 1.00 | 1.00 | 0.99 | 0.99 | 0.99 | 0.99 |
| 5.0 | 1.00 | 1.00 | 1.00 | 1.00 | 1.00 | 1.00 | 1.00 | 1.00 | 1.00 | 1.00 |

To further characterize the filter performance of the webs of Examples 5 to 8, the non-deposited particles following a dust impingement time of 5 minutes were compared with one another. The results are listed below in Table 5:

TABLE 5

| Web of Example No. | 5 | 6 | 7 | 8 |
|---|---|---|---|---|
| Particle amount in untreated gas | 121,000 | 121,000 | 124,000 | 117,000 |
| Particle amount in treated gas | 11,200 | 2,200 | 3,100 | 5000 |

What is claimed is:

1. A composition comprising an aromatic polyamide which is a polymer with the repeating structural units selected from the group consisting of formulae I, II and III -OC-Ar¹-CO-NH-Ar²-NH-      (I), -OC-Ar¹-CO-NH-Ar³-NH-      (II), -OC-Ar¹-CO-NH-Ar⁴-NH-      (III), where $Ar^1$, $Ar^2$, $Ar^3$ and $Ar^4$ are each independently of the others a bivalent monocylic or polycyclic aromatic radical whose free valences are disposed para or meta or comparably parallel, coaxial or kinked to each other, $Ar^3$ and $Ar^4$ or $Ar^2$, $Ar^3$ and $Ar^4$, is present in a polymer molecule, each have different individual case meanings within the scope of the given definitions, and the respective monomer building blocks underlying the polymer are selected so as to produce an aromatic polyamide which is soluble in organic solvents and from 0.01 to 30% by weight based on the weight of the composition, of an organic or organometallic charge control agent.

2. The composition of claim 1, wherein the aromatic polyamide is a polymer with the repeating structural units of the above-defined formulae I, II and III where $Ar^1$ is a bivalent monocyclic or polycyclic aromatic radical whose free valences are disposed para or comparably parallel or coaxial to each other, $Ar^2$ is a bivalent monocyclic or polycyclic aromatic radical whose free valences are disposed para or comparably parallel or coaxial to each other, $Ar^3$ is a radical of the formula IV -Ar⁵-X-Ar⁶-      (IV)

where $Ar^5$ and $Ar^6$ are each independently of the other a bivalent monocyclic or polycyclic aromatic radical whose free valences are disposed para or comparably parallel or coaxial to each other or where $Ar^6$ additionally is a bivalent monocyclic or polycyclic aromatic radical whose free valences are disposed meta or comparably kinked to each other, X is a group of the formula —O—, —S—, —SO₂—, —O—phenylene—O— or alkylene, and where $Ar^4$ has one of the meanings defined for $Ar^2$ or $Ar^3$ but differs from the particular $Ar^2$ or $Ar^3$ of a molecule.

3. The composition of claim 1, wherein the aromatic polyamide is a polymer with the repeating structural units of the above-defined formula I where $Ar^1$ is a bivalent monocyclic or polycyclic aromatic radical whose free valences are disposed meta or comparably kinked to each other and $Ar^2$ is a bivalent monocyclic or polycyclic aromatic radical whose free valences are disposed meta or comparably kinked to each other.

4. The composition of claim 2, wherein $Ar^1$ and $Ar^2$ are each 1,4-phenylene, $Ar^5$ and $Ar^6$ are each 1,4-phenylene, X is —O—, —$CH_2$— or —O—1,4-phenylene—O—, and $Ar^4$ is a bivalent radical of 3,3'-dichlorobenzidine, of 3,3'-dimethylbenzidine, of 3,3'-dimethoxybenzidine or of 3,4'-diaminodiphenyl ether.

5. The composition of claim 1, including a charge control agent as present in toners for electrophotographic processes.

6. The composition of claim 1, including as the charge control agent one or different compounds of the following classes:

triphenylmethanes; ammonium and immonium compounds; fluorinated ammonium and immonium compounds; biscationic amides; polymeric ammonium compounds; diallylammonium compounds; aryl sulfide derivatives; phenol derivatives; phosphonium compounds and fluorinated phosphonium compounds; calix(n)arenes; metal complex compounds; benzimidazolones; or azines, thiazines or oxazines listed in the Colour Index as Pigments, Solvent Dyes, Basic Dyes or Acid Dyes.

7. The composition of claim 6, wherein the triphenylmethanes are compounds of the formula (1)

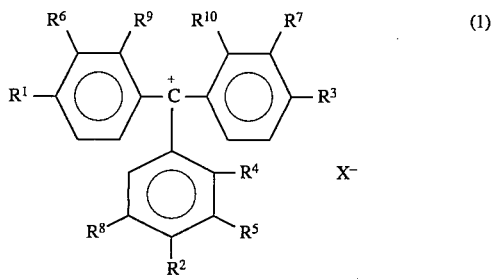

where
$R^1$ and $R^3$ are identical or different and each is —$NH_2$, a mono- or dialkylamino group whose alkyl groups have 1–4 carbon atoms, a mono- or di-omega-hydroxyalkylamino group whose alkyl groups have 2–4 carbon atoms, an unsubstituted or N-alkyl-substituted phenyl or phenalkylamino group whose alkyl has 1–4 carbon atoms, whose phenalkyl group has 1 to 4 carbon atoms in the aliphatic bridge, and whose phenyl nucleus can carry one or two of the following substituents: alkyl having 1 or 2 carbon atoms, alkoxy having 1 or 2 carbon atoms and a sulfonic acid group,
$R^2$ is hydrogen or has one of the meanings mentioned for $R^1$ and $R^3$,
$R^4$ is hydrogen, halogen or a sulfonic acid group, or forms together with
$R^5$ a fused-on phenyl ring,
$R^5$ forms together with $R^4$ a fused-on phenyl ring,
$R^6$, $R^7$, $R^9$ and $R^{10}$ are each hydrogen or an alkyl radical having 1 or 2 carbon atoms
$R^8$ is hydrogen or halogen and $X^-$ is one equivalent of an anion.

8. The composition of claim 6, wherein the fluorinated ammonium and immonium compounds are compounds of the formula (3)

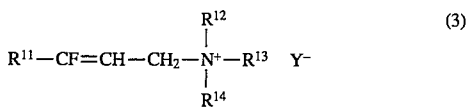

where
$R^{11}$ is perfluorinated alkyl having 5–11 carbon atoms,
$R^{12}$, $R^{13}$ and $R^{14}$ are identical or different and each is alkyl having 1–5, carbon atoms,
$Y^-$ is one equivalent of an anion.

9. The composition of claim 6, wherein the biscationic amides are compounds of the formula (4)

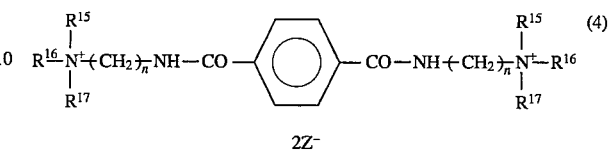

where
$R^{15}$, $R^{16}$ and $R^{17}$ are identical or different alkyl radicals having 1–5 carbon atoms,
n is an integer from 2 to 5,
and $Z^-$ is one equivalent of an anion.

10. The composition of claim 6, wherein the diallylammonium compounds are the compounds of the formula (5)

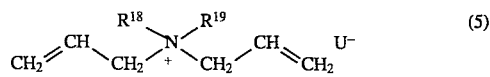

where
$R^{18}$ and $R^{19}$ are identical or different alkyl groups having 1–5 carbon atoms, and $U^-$ is one equivalent of an anion.

11. The composition of claim 6, wherein the polymeric ammonium compounds are compounds of the formula (6)

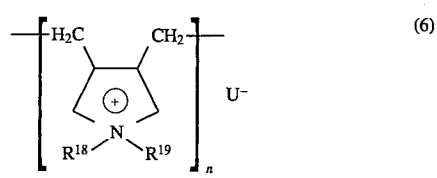

where n has a value corresponding to molecular weights from 5000 to 500,000 and $R^{18}$ and $R^{19}$ are identical or different alkyl groups having 1–5 carbon atoms, and $U^-$ is one equivalent of an anion.

12. The composition of claim 6, wherein the aryl sulfide derivatives are compounds of the formula (7)

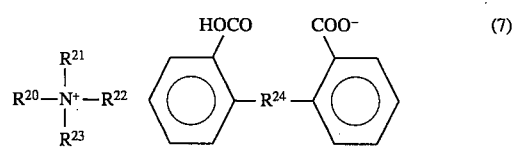

where
$R^{20}$, $R^{21}$, $R^{22}$ and $R^{23}$ are identical or different alkyl groups having 1–5, carbon atoms, and
$R^{24}$ is one of the bivalent radicals —S—, —S—S—, —SO— or —$SO_2$—.

13. The composition of claim 6, wherein the phenol derivatives are compounds of the formula (8)

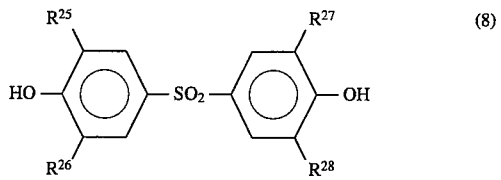

where
$R^{25}$ and $R^{27}$ are alkyl or alkenyl groups having 1 to 5, carbon atoms and $R^{26}$ and $R^{28}$ are each hydrogen or alkyl having 1 to 3 carbon atoms.

14. The composition of claim 6, wherein the phosphonium compounds and fluorinated phosphonium compounds are compounds of the formula (9)

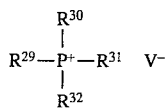

where
$R^{29}$, $R^{30}$, $R^{31}$ and $R^{32}$ are identical or different alkyl groups having 1–8, carbon atoms and $V^-$ is one equivalent of an anion or (10);

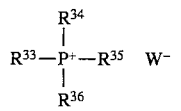

where $R^{33}$ is a highly fluorinated alkyl radical having 5–15 carbon atoms, $R^{34}$, $R^{35}$ and $R^{36}$ are each alkyl having 3–10 carbon atoms or phenyl, and $W^-$ is the equivalent of an anion.

15. The composition of claim 6, wherein the calix(n)arenes are compounds of the formula (11)

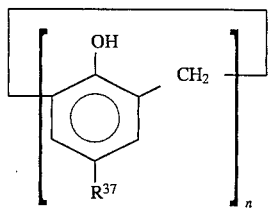

where
$R^{37}$ is hydrogen, halogen, straight-chain or branched alkyl having 1–12 carbon atoms, aralkyl, cyclohexyl, —$NO_2$, —$NH_2$, —$NHR^{38}$ or —$NR^{38}R^{39}$, where $R^{38}$ and $R^{39}$ are each alkyl having 1–8 carbon atoms, phenyl or —$Si(CH_3)_3$.

16. The composition of claim 6, wherein the metal complex compounds are compounds of the formula (12), (13) and (14)

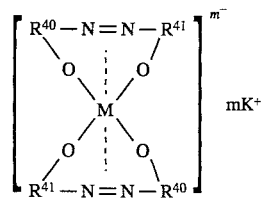

where
M is a 2- or 3-valent metal atom,
$R^{40}$ and $R^{41}$ are each two-bonded aromatic rings.

17. The composition of claim 6, wherein the benzimidazolones are compounds of the formula (15)

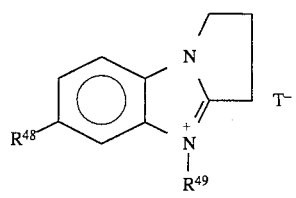

where
$R^{48}$ is alkyl having 1–5 carbon atoms and $R^{49}$ is alkyl having 1–12 carbon atoms and $T^-$ is one equivalent of an anion.

18. The composition of claim 6, wherein the azines are azines of the following Color Index numbers: C.I. Solvent Black 5, 5:1, 5:2, 7, 31 and 50; C.I. Pigment Black 1, C.I. Basic Red 2, C.I. Basic Black 1 and 2 and C.I. Oxidation Base 1; or thiazines of the following Color Index numbers: C.I. Basic Blue 9, 24 and 25 and C.I. Solvent Blue 8; or oxazines of the Color Index numbers C.I. Pigment Violet 23, C.I. Basic Blue 3, 10 or 12; and also the azines, thiazines and oxazines listed in the Color Index under Basic Dye or Acid Dye.

19. The composition of claim 7, wherein $R^1$ and $R^3$ are each phenylamino, $R^2$ is 3-methylphenylamino, and $X^-$ is one equivalent of sulfate.

20. The composition of claim 10, wherein $R^{18}$ and $R^{19}$ are each methyl and $U^-$ is a tetraphenylborate anion.

21. The composition of claim 8, wherein $Y^-$ is tetraphenylborate or tetrafluoroborate.

22. The composition of claim 12, wherein $R^{20}$, $R^{21}$, $R^{22}$ and $R^{23}$ are each propyl and $R^{24}$ is a disulfide bridge.

23. The composition of claim 16, including as charge control agent a compound of the formula (13) where $R^{42}$ is chlorine, $R^{43}$ is hydrogen and Q is a proton.

24. The composition as claimed in claim 1, wherein the control agent is in an amount of from 0.01 to 10% by weight, based on the weight of the composition.

25. The composition as claimed in claim 1, wherein the control agent is in an amount of from 0.1 to 5 % by weight, based on the weight of the composition.

26. The composition as claimed in claim 3, wherein $Ar^1$ is 1,3-phenylene and $Ar^2$ is 1,3-phenylene.

27. The composition as claimed in claim 7, wherein $R^1$ and $R^3$ are identical or different and are an alkyl group having from 1–2 carbon atoms, a mono- or di-omega-hydroxyalkylamino whose alkyl group has 2 carbon atoms, and unsubstituted or N-alkyl-substituted phenyl or phenalkylamino group whose alkyl has 1–2 carbon atoms, whose phenalkyl group has 1–2 carbon atoms in the aliphatic bridge, and whose phenyl nucleus can carry one or two of the following substituents: alkyl having 1 or 2 carbon atoms, alkoxy having 1 or 2 carbon atoms and a sulfonic acid group,
$R^4$ is chlorine,
$R^6$, $R^7$, $R^9$ and $R^{10}$ are methyl,
$R^8$ is chlorine,
$X^-$ is chloride, sulfate, tetrachloroaluminate, molybdate, phosphoromolybdate or borate anion.

28. The composition as claimed in claim 8, wherein $R^{12}$, $R^{13}$, and $R^{14}$ are identical or different and each is alkyl having 1–2 carbon atoms, $Y^-$ is a tetrafluoroborate or tetraphenylborate anion.

29. The composition as claimed in claim 9, wherein $R^{15}$, $R^{16}$ and $R^{17}$ are methyl and $Z^-$ is tetraphenylborate anion.

30. The composition as claimed in claim 10, wherein $R^{18}$ and $R^{19}$ are identical or different alkyl groups having 1–2 carbon atoms, and $U^-$ is a tetraphenyl borate.

31. The composition as claimed in claim 30, wherein $R^{18}$ and $R^{19}$ are methyl.

32. The composition as claimed in claim 12, wherein $R^{20}$, $R^{21}$, $R^{22}$ and $R^{23}$ are identical or different alkyl groups having 2–3 carbon atoms.

33. The composition as claimed in claim 13, wherein $R^{25}$ and $R^{27}$ are alkyl or alkenyl groups having 1–3 carbon atoms and $R^{26}$ and $R^{28}$ are each hydrogen or methyl.

34. The composition as claimed in claim 14, wherein $R^{29}$, $R^{30}$, $R^{31}$ and $R^{32}$ are identical or different alkyl groups having 3–6 carbon atoms and $V^-$ is a halide or $R^{33}$ is highly fluorinated alkyl radical having 6–10 carbon atoms.

35. The composition as claimed in claim 15, wherein $R^{37}$ is chlorine, benzyl or phenethyl.

36. The composition as claimed in claim 16, wherein $R^{40}$ and $R^{41}$ are

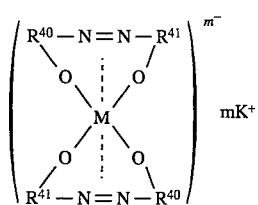 (12)

where
M is chromium, cobalt, iron, zinc or aluminum,
$R^{40}$ and $R^{41}$ are identical or different and are of the formulae

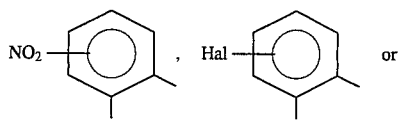 or

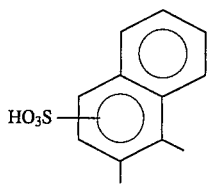

Hal is halogen, m is 1 or 2, and $K^+$ is one equivalent of a cation, where
M is a 2- or 3-valent metal atom,
$R^{42}$ is hydrogen, halogen, nitro or amidosulfonyl,
$R^{43}$ is hydrogen or nitro,
$R^{44}$ is hydrogen, sulfo, —CO—NH—$R^{45}$, where $R^{45}$ is phenyl, alkyl having 1–5 carbon atoms, which may be substituted by a mono-, di- or trialkylamino group, and Q is a counter-ion which makes the complex neutral,

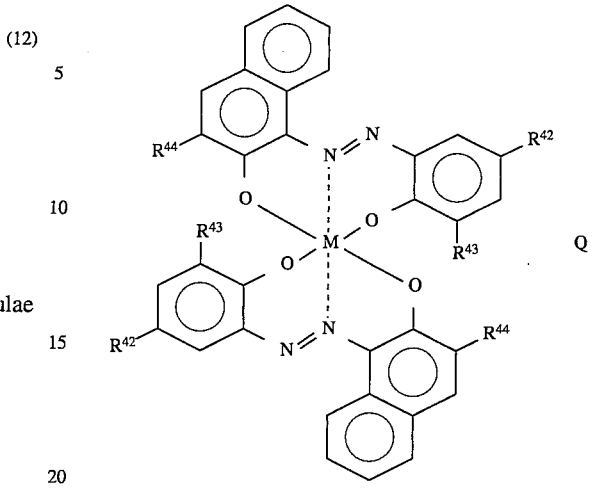 (13)

where
Me is a bivalent metal center atom,
$R^{47}$ and $R^{46}$ are identical or different, straight-chain or branched alkyl groups having 1–8, carbon atoms.

37. The composition as claimed in claim 36, wherein M is chromium, cobalt, or iron,
$R^{42}$ is Cl,
Q is a proton, an alkali metal ion or an ammonium ion,
$R^{47}$ and $R^{46}$ are identical or different, and are a straight-chain or branched alkyl group having 3–6 carbon atoms.

38. The composition as claimed in claim 17, wherein $T^-$ is chloride or tetrafluoroborate.

* * * * *